May 31, 1955 — C. B. BALIS — 2,709,453
NONMETALLIC FLEXIBLE CONDUIT AND METHOD OF MAKING SAME
Filed Nov. 8, 1952 — 2 Sheets-Sheet 2
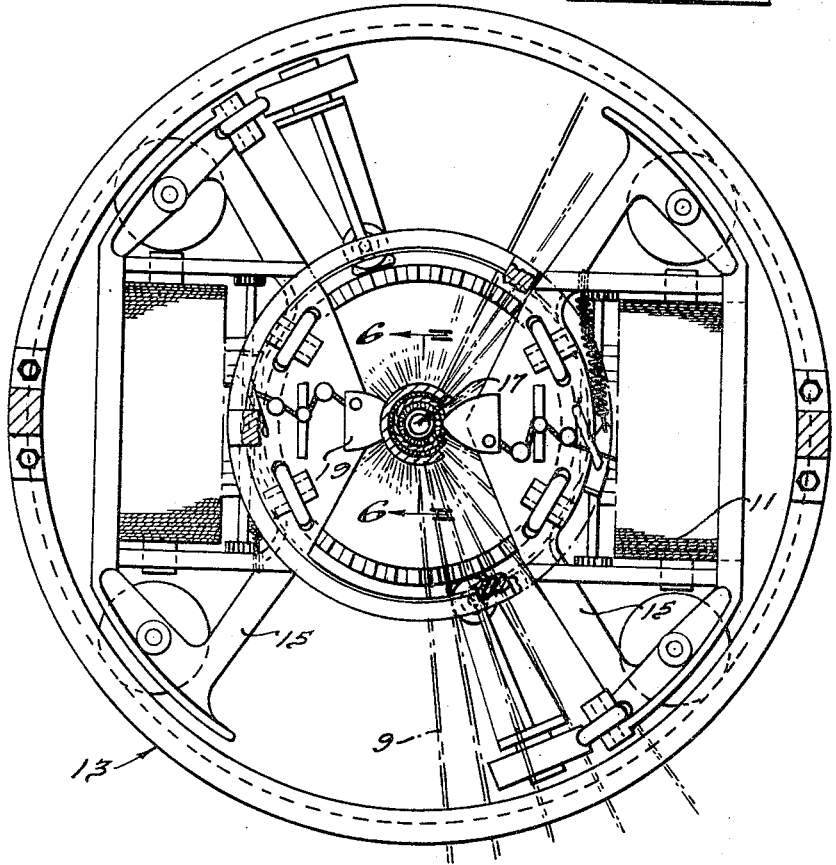
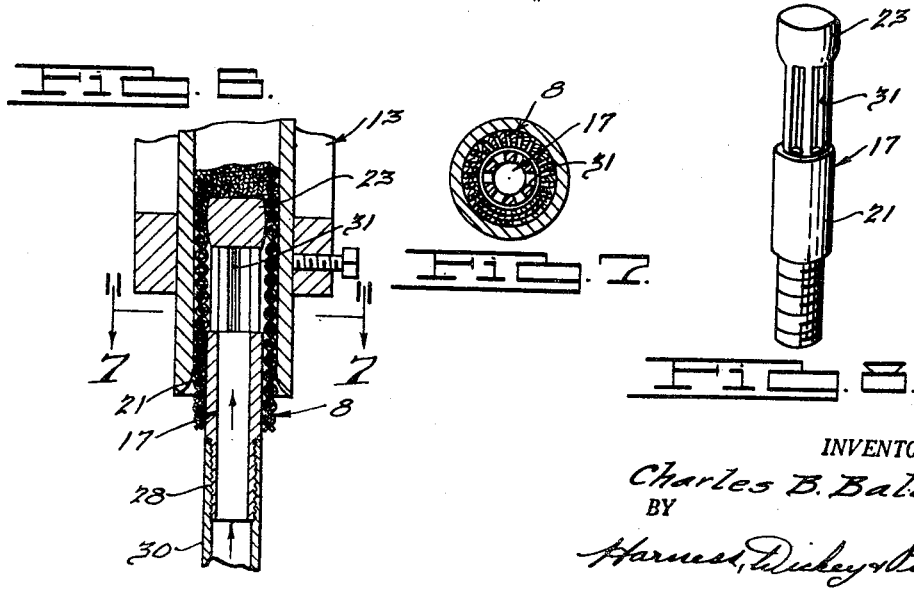
INVENTOR.
Charles B. Balis.
BY
Harness, Dickey & Pierce
ATTORNEYS.

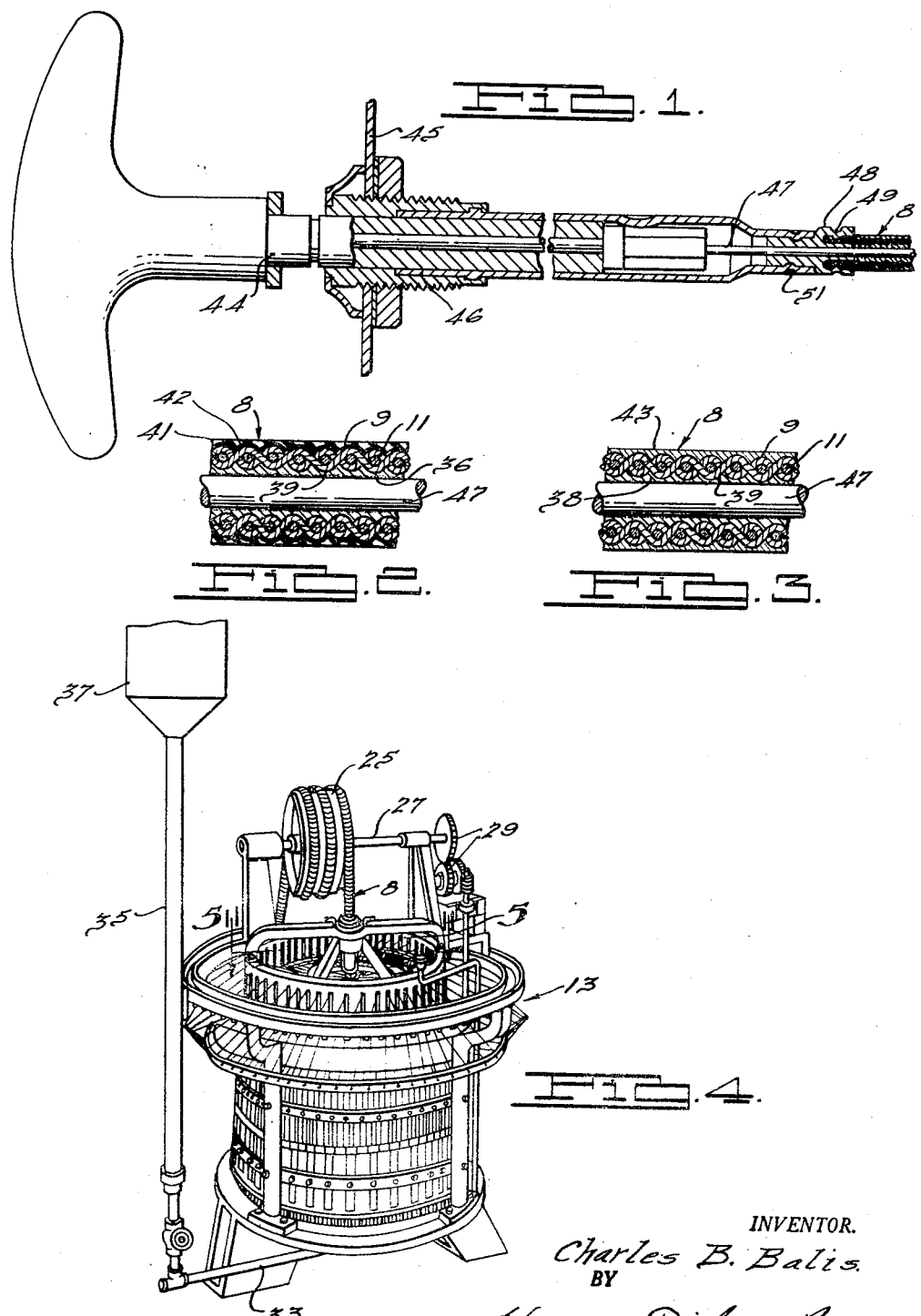

United States Patent Office 2,709,453
Patented May 31, 1955

2,709,453

NONMETALLIC FLEXIBLE CONDUIT AND METHOD OF MAKING SAME

Charles B. Balis, Detroit, Mich., assignor to Frank D. Saylor & Son, Detroit, Mich., a partnership Application November 8, 1952, Serial No. 319,523

9 Claims. (Cl. 138—68)

This invention relates generally to nonmetallic, flexible conduits and a method of making the same, and is a division and continuation-in-part of applicant's copending application for improvements in Nonmetallic Flexible Conduit and Method of Making Same, Serial No. 247,870, filed September 22, 1951, now abandoned.

Nonmetallic conduits have been manufactured in the past for various uses. These conduits have generally been made by the weaving of cotton and paper strands or cords on a circular loom of a known construction, such as shown in United States Letters Patent No. 1,775,325 and No. 1,915,335. With machines of the aforementioned type a nonmetallic conduit or loom can be manufactured in a relatively rapid and inexpensive manner. The use of nonmetallic conduits in the past has been somewhat limited, because no one has heretofore known of any satisfactory manner of making the same so that they could be used as housings or casings for movable control members. For example, in the manufacture of vehicles many types of movable control rods or cables are employed, which must be encased in a flexible conduit. While there are many such applications in the automotive and other fields, one illustrative application is in connection with hood latch controls for automobiles, wherein a handle is provided within the driver's compartment which may be actuated by the driver to release the hood latch adjacent the front of the automobile. For this purpose a control rod or cable extends from the handle within the driver compartment, beneath the hood of the vehicle, to the hood latch at the front thereof. These cables or rods have heretofore been housed or encased by a metallic housing in the form of a coil spring extending around the cable throughout its length. The use of a metallic covering or housing has many disadvantages. In the first place, the cable or rod as well as the housing, is subject to rust and corrosion. Still further, the metallic housing causes rattles within the vehicle, due to the fact that it is disposed in close proximity to other metallic parts. Still further, with a spring-type metallic housing, the rod or cable is not protected against acid, dirt, or other foreign matter which may either attack the metal or become lodged between the housing and rod to prevent easy, smooth operation of the control mechanism. In addition to this, it has been difficult to adequately lubricate the housing or cable because of the impossibility of keeping water out of the housing, and the fact that when grease or oil is used as a lubricant it tends to run out at temperatures of around 250° F., or become so stiff as to create additional friction at temperatures of 0° F., or below. Thus, in automotive vehicles, much difficulty has ben encountered with so-called remote control mechanisms for operating parts of the vehicle.

It is an object of this invention to provide a nonmetallic, flexible conduit which can be satisfactorily used to replace metallic conduits of the aforementioned type and thereby eliminate the aforementioned difficulties and problems.

It is a further object of this invention to provide a nonmetallic, flexible conduit having its inner wall lubricated with a material which possesses satisfactory lubricating qualities at both high and low temperatures, and which will not readily wear off or deteriorate.

It is a still further object of this invention to provide a nonmetallic, flexible conduit of the aforementioned type, which will not be permanently affected by kinks or bends put therein during the installation of the conduit, and which has greater tensile strength than coil spring type metallic conduits which have been heretofore used.

It is a still further object of this invention to provide a conduit of the aforementioned type, which is electrically nonconductive and can act as an insulator.

It is a still further object of this invention to provide a conduit of the aforementioned type, which will not rattle and which may be acid, oil, gasoline, water and rust proof.

It is a still further object of this invention to provide a novel method of manufacturing a conduit of the aforementioned type, and more particularly to provide an improved method of applying lubricant to the inner wall or surface of the conduit so that the same will adhere thereto and not readily flake or wear off.

It is a still further object of this invention to provide a method of forming a conduit of the aforementioned type, in which the lubricant is carried by and deposited on the conduit wall by materials which are used to impregnate the conduit and make it more satisfactory in operation and use.

It is a still further object of this invention to provide a method of forming a conduit of the aforementioned type, in an inexpensive, simple and rapid manner.

It is a still further object of this invention to provide a method and machine for manufacturing conduits of the aforementioned type, in which the conduit can be woven, impregnated and lubricated in one machine and in a simple, continuous operation.

These and other objects of this invention will become apparent from the following detailed description, taken in conjunction with the accompanying drawings, in which:

Figure 1 is a longitudinal view, partially in section and partially in elevation, of an automobile hood latch control mechanism embodying the conduit of this invention;

Fig. 2 is a longitudinal view, partially in section and partially in elevation, illustrating one form of the conduit of this invention encasing a movable rod or cable;

Fig. 3 is a view similar to Fig. 2, illustrating a further type of the conduit of this invention;

Fig. 4 is a perspective view of a circular loom which produces the conduits of this invention;

Fig. 5 is an enlarged view, partially in section and partially in elevation, of the structure illustrated in Fig. 4, taken along the line 5—5 thereof;

Fig. 6 is a sectional view of the structure illustrated in Fig. 5, taken along the line 6—6 thereof;

Fig. 7 is a sectional view of the structure illustrated in Fig. 6, taken along the line 7—7 thereof; and Fig. 8 is a perspective view of the hollow mandrel about which the conduit is formed, and through which lubricant is applied to the conduit.

Referring now to the drawings, and more particularly to Figs. 2 and 3, it will be seen that the conduit of this invention is illustrated at 8 and includes strands 9 of cotton or other suitable material, interwoven with strands 11 of paper or other suitable material, to provide a flexible woven conduit. This conduit is formed on a circular loom 13, which, except for modifications as will be hereinafter brought out, is of the conventional known type and need not be described in detail. The loom does, however, incorporate two or more shuttles 15, which rotate around a centrally disposed mandrel 17. The shuttles, during their operation are actuated vertically so that they pass between the various strands of material to be woven. Needles 19 are provided for weaving the strands of cotton 9 and paper 11 and the needles move to cause the weaving operation, in the usual manner. The paper and cotton strands are fed through the needles and shuttles, as illustrated in Figs. 4 and 5, to weave the materials into a conduit, around the mandrel 17, which has spaced accurately finished cylindrical portions 21 and 23, which determine the inside diameter of the conduit. As the conduit is woven around the mandrel, it is continuously removed or moved upwardly from the loom 13 and wound on reels 25 which are rotatably supported on the loom supporting frame by a spindle or shaft 27. The spindle or shaft 27 is driven through gears 29 by a suitable motor, in the desired timed relationship with the weaving operation, to draw the continuous conduit upwardly from the mandrel and wind the same on reel 25.

The structure heretofore described is generally conventional, with circular looms of the type illustrated in the aforementioned patents. In order to form the conduits of this invention, the mandrel 17 is hollow and has its lower end connected at 28 to the upper end of a pipe 30. The mandrel 17 between the portions 23 and 21 is longitudinally slotted at 31 so as to provide a plurality of longitudinally extending circumferentially spaced slots which communicate the exterior or outer periphery of the mandrel with the hollow interior thereof. The lower end of the pipe 30 is connected with a laterally extending conduit 33, which in turn is connected exteriorly of the loom 13 with a vertically extending conduit 35, having a hopper 37 connected to the upper end thereof. The hopper 37 is adapted to contain material to be fed through the conduits 35, 33 and 29 and the mandrel slots 31, to provide a lubricant coating on the conduit, of the type which will hereinafter appear. While the material could be fed under pressure to the conduit, it has been found that this is not necessary and that if the hopper 37 is disposed above the mandrel, the material will flow by gravity to the conduit. Therefore, if the hopper 37 is kept in a filled condition, the material will flow through the conduits and through the hollow and slotted mandrel to the inner wall 39 of the conduit to coat and impregnate the same and provide the lubricating and other desired characteristics of the conduit of this invention. It should be noted that the conduit is coated and impregnated immediately after it is woven and before it leaves the loom, so that it is woven and coated in a continuous operation and it leaves the loom in such a condition. Furthermore, it should be noted that the upper end or portion 23 of the mandrel 17 acts as a wiper to wipe off any excess material which might be deposited on the inner wall of the conduit and it thereby maintains the desired thickness of the coating and the desired inside diameter of the conduit.

While the material which is used for coating the inner wall of the conduits may vary in accordance with the ultimate use of the conduit, it has been found that finely divided, high temperature resistant inorganic lubricating material is very satisfactory. Graphite and molybdenum disulfide are examples of such a satisfactory material. While it has been known that graphite and molybdenum disulfide are good lubricants, no one has heretofore been able to devise a method of properly applying them to the inner wall of a woven conduit so that they will adhere thereto and will not readily flake therefrom or wear off. Various methods of applying graphite to the interior of the conduit have been attempted, such as by blowing the graphite into the interior thereof. This, however, has not proven satisfactory, in that the graphite will not uniformly coat the inner wall of the conduit, nor will it properly adhere thereto. The same is true for molybdenum disulfide.

The conduit illustrated in Fig. 2 has its inner wall 39 coated at 36 by mixing lubricant particles such as graphite particles or molybdenum disulfide particles, with an asphalt paint, which mixture flows from the hopper 37 through the conduits and mandrel slots 31, into contact with the interior or inner wall of the conduit. This asphalt paint is, of course, an ingredient which will form a siccative coating and when the asphalt paint contacts the inner wall of the conduit, the paint will soak into and at least partially impregnate the conduit, while the lubricant will either partially impregnate the conduit or will remain almost entirely on the inner surface of the conduit as a lubricating coating. The penetration of the lubricant into the woven fabric can be controlled by the sizes of the lubricant particles which are mixed into the asphalt paint, or the ingredients which will form a siccative coating. If microfine lubricant only is mixed with the siccative coating ingredients, the conduit will be at least partially impregnated with lubricant, while if only coarse lubricant particles, or a mixture of coarse and fine lubricant particles, are mixed with the siccative coating ingredients, the coarse lubricant particles will act as a filter when the mixture contacts the conduit wall, so that the lubricant will be left on the wall to coat the same, although it may slightly penetrate the fabric while the asphalt paint will penetrate or impregnate the fabric to a greater extent.

It should at this time be pointed out that the asphalt paint acts not only as a siccative coating for carrying the lubricant particles into bonded adherence with the woven conduit, but the paint also acts as a filler for the conduit, to stiffen and give the conduit greater strength so that it will not readily collapse if a clamp is placed therearound to secure it in place. The conduit 8 illustrated in Fig. 3 has its inner wall 39 coated at 38 by mixing the lubricant with a siccative varnish and conveying this material through the mandrel to the conduit in the same manner as previously described. The varnish also acts as a carrier for the lubricant and forms a siccative coating, but in addition impregnates the conduit so as to make the same oil, acid, and water proof.

After the inner wall of the conduit has been coated as previously described, and wound on reel 25, the exterior or outer periphery of the conduit can be coated with material in accordance with the use to which it is to be put. The conduit 8 illustrated in Fig. 2 has its outer periphery coated with asphalt paint 40 without lubricant mixed therein, and the conduit is then baked in an oven until the asphalt paint has hardened. In addition, this conduit is coated or covered with rubber material 41 in the form of neoprene latex or the like. The conduit illustrated in Fig. 3 is designed for use where oilproofing thereof is desirable, and for this purpose the outer periphery of the conduit is coated with an oilproof lacquer 42.

It will thus be seen that the conduits of this invention are formed in a novel, simple manner, so that they are of the desired strength and so that the inner wall thereof is uniformly coated with a high temperature resistant, inorganic lubricant which will satisfactorily lubricate any moving part therein at various operating temperatures and will not readily wear off, flake or become unusable. Also, it will be appreciated that the conduit can be exteriorly coated with any suitable material so that the same will be resistant against any desired materials. It will furthermore be understood that various types of ingredients may be mixed with the lubricant, which will produce a siccative coating, or a coating which will cause the aforementioned desired bonding of the lubricant on the inner wall of the conduit.

One use of a conduit of this invention is illustrated in Fig. 1, wherein the conduit is employed in a remote control hood latch mechanism. This hood latch mechanism includes a push pull handle structure 44, which is normally disposed within the driver's compartment of an automotive vehicle and supported in a conventional fire wall 45 by a housing 46. Connected with the handle structure 44 is a rod or cable 47 which extends beneath the hood of the vehicle to the latch mechanism at the front thereof, and is encased in the conduit. The conduit is connected with the housing 46 by a fitting 48, in which one end of the conduit is crimped, as at 49. The fitting 48 extends into the housing 46 and is crimped or otherwise connected thereto at 51. The conduit is thus firmly connected with the rod supporting mechanism adjacent each end of the hood latch control and the conduit is stronger in tension or axial loading than would be a coil spring metallic housing. In addition, the conduit may be oilproof, waterproof, acidproof and gasolineproof. In addition, because the conduit is made of fabric, it is flexible and will not permanently kink, while at the same time it is strong enough to have clamp members placed therearound to secure it to the body of the vehicle. Still further, the conduit, because of its fabric nature, will not rattle when in contact with any metallic parts of the vehicle, and eliminates sticking of the cable 47 therein because of the lubricant coating applied to the interior wall thereof.

While only one particular use for the conduit has been described in detail, it will be appreciated that the conduit has many uses and provides an improved and satisfactory housing and casing for movable rods or other parts.

What is claimed is:

1. The method of forming a conduit, including the steps of weaving a plurality of strands of material into a woven conduit, mixing a high temperature resistant, solid inorganic lubricant in particle form with asphalt paint, conveying said mixture to the interior of said conduit and depositing the same on the inner wall of said conduit so that the lubricant will at least coat the inner wall of said conduit and the asphalt paint will bond the said lubricant to said inner wall and at least partially impregnate said conduit.

2. The method of forming a conduit, including the steps of weaving a plurality of strands of material into a woven conduit, mixing a high temperature resistant, solid inorganic lubricant in particle form with a siccative varnish, conveying said mixture to the interior of said conduit and depositing the same on the inner wall of said conduit so that the lubricant will at least coat the inner wall of said conduit and the said varnish will bond the said lubricant to said inner wall and at least partially impregnate said conduit.

3. The method of forming a conduit, including the steps of weaving a plurality of strands of material into a woven conduit, mixing a high temperature resistant solid inorganic lubricant in particle form with asphalt paint, conveying said mixture to the interior of said conduit and depositing the same on the inner wall of said conduit so that the lubricant will at least coat the inner wall of said conduit and the asphalt paint will bond the said lubricant and at least partially impregnate said conduit, and coating the outer wall of said conduit with a rubber type material.

4. The method of forming a conduit, including the steps of weaving a plurality of strands of material into a woven conduit, mixing a high temperature resistant, solid inorganic lubricant in particle form with a siccative varnish, conveying said mixture to the interior of said conduit and depositing the same on the inner wall of said conduit so that the lubricant will at least coat the inner wall of said conduit and the said varnish will bond the said lubricant and at least partially impregnate said conduit, and coating the outer wall of said conduit with oilproof lacquer.

5. The method of forming a conduit, including the steps of weaving strands of material into a woven conduit, mixing fine and coarse particles of a high temperature resistant, solid inorganic lubricant in particle form with a siccative varnish, conveying said material to the interior of said conduit and depositing the same on the inner wall of said conduit, allowing said material to dry and harden on said conduit so that the coarse lubricant particles act as a filter, leaving a lubricant mixture coated on the inside wall of said conduit, and of wiping the mixture on the inside wall of said conduit prior to the drying and hardening of the same, to control the inside diameter and the depth of the lining of the conduit.

6. A conduit including strands woven together to form a conduit of predetermined size and shape, the inner surface of said conduit being coated with a siccative varnish having dispersed throughout the said coating a solid inorganic lubricant selected from the group consisting of graphite and molybdenum disulfide.

7. A conduit including strands woven together to form a conduit of predetermined size and shape, the inner surface of said conduit being coated with a siccative varnish coating having dispersed throughout the said coating a solid inorganic lubricant in particle form.

8. A conduit in accordance with claim 7, wherein said lubricant is molybdenum disulfide.

9. A conduit in accordance with claim 7, wherein the said lubricant is graphite.

References Cited in the file of this patent

UNITED STATES PATENTS

| | | |
|---|---|---|
| 942,790 | Miller | Dec. 7, 1909 |
| 1,340,316 | Bierbaum | May 18, 1920 |
| 1,410,967 | Thompson | Mar. 28, 1922 |
| 1,801,813 | Kennedy | Apr. 21, 1931 |
| 2,146,275 | Thompson | Feb. 7, 1939 |

FOREIGN PATENTS

| | | |
|---|---|---|
| 547,821 | Great Britain | Sept. 14, 1942 |